May 22, 1934.  E. G. HEDGES  1,959,955
FLUSH VALVE
Filed Oct. 10, 1930
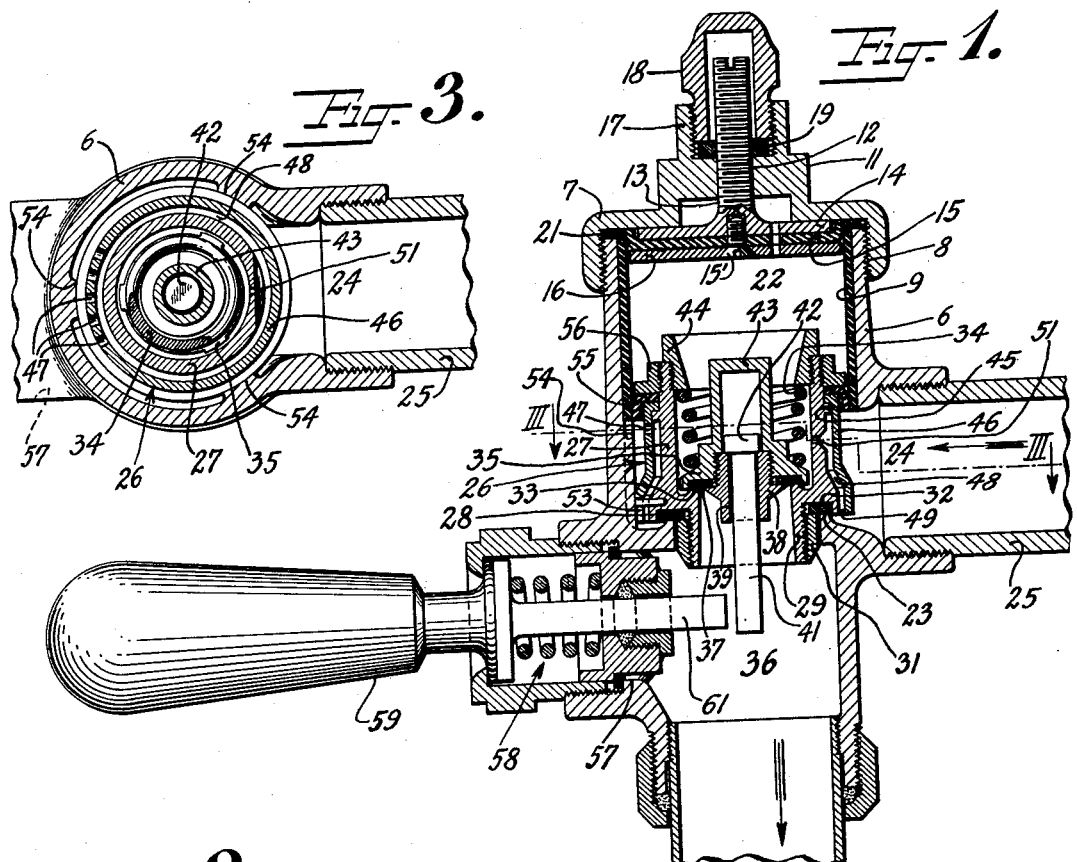
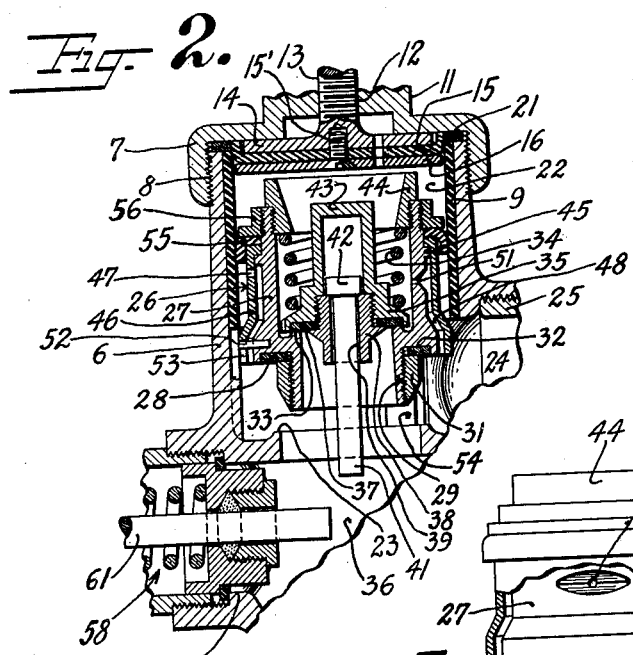
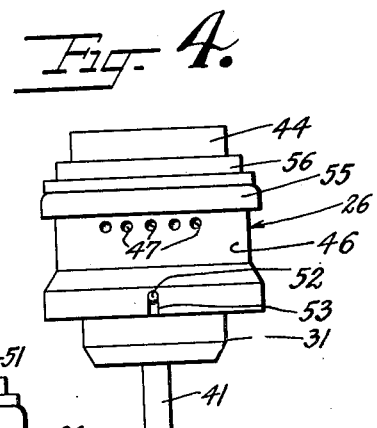
INVENTOR
E. G. HEDGES
BY
ATTORNEY Patented May 22, 1934

1,959,955

UNITED STATES PATENT OFFICE 1,959,955

FLUSH VALVE

Edward G. Hedges, Newark, N. J.

Application October 10, 1930, Serial No. 487,652

3 Claims. (Cl. 137—93)

This invention relates to flush valves and has for its object to provide a new and improved device of such a character.

A further object of the invention is to improve the construction of flush valves whereby the equalizing port or by-pass is prevented from becoming clogged with sediment or dirt.

A still further object of the invention is to provide in such valves means for adjusting the duration of the flush period.

Another object of the invention is to prevent the equalizing chamber walls from becoming corroded and thus preventing at all times free movement of the valve proper.

Other objects of the invention will become apparent as the following description is read.

Referring to the drawing:

Fig. 1 is a sectional view through one form of valve embodying the invention, showing the movable parts of the valve in closed position.

Fig. 2 is a view similar to Fig. 1, with parts omitted, showing the movable parts of the valve in a different or open position.

Fig. 3 is a sectional view taken on line III—III of Fig. 1, looking in the direction of the small arrows.

Fig. 4 is an elevational view of the siphon skirt for protecting the equalizing port or by-pass.

Fig. 5 is a similar view to Fig. 4 but on the opposite side and having a portion broken away to show the equalizing port or by-pass.

Like numerals refer to like parts throughout the several figures.

Referring to Fig. 1, I have illustrated a flush valve having a casing consisting of one section 6 closed at its upper end by a cap 7, which latter is threaded to the casing at 8. Located within the casing is a sleeve 9 of hard rubber or bakelite which prevents corrosion of the inner wall of the casing which latter is usually formed of brass. The sleeve of hard rubber may be secured within the casing in any well known manner as by a tight fit or by being pinned therein.

The cap 7 has boss 11 which has a centrally threaded opening 12 in which is threadedly engaged a stem 13 carrying at its lower end a plunger 14, the latter consisting of a leather washer 15 which is secured to the plunger 14 by a screw 15' and a flat disk washer 16. Outwardly extending from the boss 11 is an annular wall 17, interiorly threaded to be engaged by a hollowed out nut 18, the upper end of the stem 13 fitting within the recess in the nut 18. A packing 19 is disposed between the nut 18 and the boss 11, so that when the nut is screwed into the annular wall 17 water leakage around the stem is prevented. Packing 21 is also provided between the cap and the casing 6 to prevent water leakage from the end of the casing.

It will be apparent from the foregoing description that by the adjustment of the plunger 14 within the casing the space 22 therein may be regulated in size as desired and by such an adjustment, as will appear more fully hereinafter, the extent of the flushing operation may be quite accurately regulated.

Within the valve is an annular valve seat 23, the seat being positioned below or substantially in line with the entrance 24 from the water main 25 which supplies water for the flushing operation.

Mounted within the casing to engage this seat is a valve 26 consisting of a tubular casting 27, having an annular washer 28 engaging the valve seat 23. The valve 26 has a depending wall 29 which is threaded on its exterior and engaged by a nut 31 which firmly clamps the washer 28 against the shoulder 32 of the valve.

Within the interior of the casting 27 is a valve seat 33 against which is pressed by the spring 34 a plunger 35 which separates the chamber 22 from the lower chamber 36. A washer 37 is secured to the face of the plunger 35 by means of a nut 38 which has a central opening 39 for guiding the sliding rod 41. The rod 41 has a head 42 which slidingly fits the hollow extension 43 of the plunger 35. The spring 34 is held in position by the annular nut 44 which is threaded to the upper end of the casting 27.

The casting 27 has an annular wall 45 extending outwardly therefrom and supported upon this wall is a skirt member 46 (see Figs. 4 and 5) which has a series of openings 47 near the upper end thereof. The skirt member and the casting 27 are so shaped as to provide an annular chamber 48 which is closed at the top by the annular wall 45 but which is open at 49 at its lower end. Opening from this chamber to the equalizing chamber 22 is the equalizing port or by-pass 51. A guide pin 52 mounted in the casting 27 engages a slot 53 in the skirt to properly position the openings 47 with reference to the equalizing port 51. Guides 54 are formed integral with the section 6 to assist in guiding the valve 26 in its movements.

At the upper end of the casting 26 and mounted upon the upper end of the skirt 46 is a washer 55 which is held in position by the nut 56. The washer tightly fits against the lining member 9.

Near the lower or outlet end of the valve is a side opening 57 in which is supported the usual operating mechanism 58 consisting of a rocking operating arm or handle member 59 and spring pressed plunger 61. The end of the plunger 61 is forced inwardly upon movement of the handle member 59 and upon moving inwardly it engages the lower end of the sliding rod 41 to start the flushing operation.

It will be noted from the foregoing description when considered in connection with the drawings, that the valve 26 through the agency of the washers 55 and 37 effectively closes the chamber 22 from the water main 25 and that the washer 23 closes the water main from the lower chamber 36 which is connected with the closet bowl which is desired to be flushed. Also that through the agency of the by-pass 51 the water pressure within the chamber 22 may be restored to equal the pressure in the water main which latter is acting to maintain the valve 26 in closed position.

With the foregoing in mind the use and operation of the invention will now be set forth.

The valve parts being in the position indicated in Fig. 1, a movement of the handle 59 laterally will actuate the plunger 61 to engage the sliding rod 41. Engagement with the rod 41 will tilt the plunger 35 and thus permit the pressure of water therein to be reduced and made smaller than the pressure in the main 25 which is operating to hold the valve 26 against the outlet valve seat 23. The pressure on the upper side of the valve being thus lessened and made lower than that on the under side, causes the valve to rise to the position indicated in Fig. 2, thus permitting the water from the main to directly flow with considerable force and volume through the closet bowl or object desired to be flushed.

This flushing operation continues until the water pressure in chamber 22 is again restored to equal that in the water main. This is accomplished through the action of the by-pass which slowly permits the water from the water main to pass into chamber 22 and fill the same. Obviously the larger the chamber 22 the longer it will take to fill it through the by-pass. It will thus be seen that by regulating the size of the chamber 22 it is possible to adjust the period of flush. This is accomplished through the adjustment of the plunger 14.

It is also apparent that where the by-pass 51 is in the direct flow of the water in the main that foreign particles in the water may clog this opening. I have discovered that such clogging may be effectively prevented by providing an ejector action immediately around the by-pass opening. Such ejector action is secured by reason of the skirt 46 and annular chamber 48 construction.

My theory of the action which takes place is that the water rushing downwardly over the lower edge of the skirt causes any particles of matter held in suspension to move downwardly away from the upper end of the chamber 48, such movement being increased by the provision of the openings 47 in the skirt. Regardless of the exact theory of action which takes place I have found by actual tests that the chamber 48 may be entirely filled with foreign matter, such as cigar ash, fine sand, or the like and that such material is effectively removed when the valve is flushed.

By reason of this effective prevention of the clogging of the by-pass, I have been able to make a simple valve construction which is economical to manufacture as the casing 6 which has been formerly made of two pieces with the upper part removable so as to permit ready access to the by-pass, can now be made of one piece.

Having thus described my invention what I claim is:

1. A flush valve comprising a casing having a movable valve member therein dividing it into an upper and a lower chamber, means for relieving the pressure in said upper chamber when it is desired to operate the valve, a by-pass movable with said valve member for restoring the pressure in said upper chamber after a predetermined period, and means cooperating with said by-pass to produce an ejector action thereon to prevent the accumulation of foreign matter therein.

2. A flush valve comprising a casing having a valve member therein dividing it into an upper and a lower chamber, means for relieving the pressure in said upper chamber when it is desired to operate the valve, a by-pass for restoring the pressure in said upper chamber after a predetermined period and means surrounding said by-pass to provide an ejector chamber to prevent the accumulation of foreign matter in said by-pass.

3. A flush valve comprising a casing having a valve member therein dividing it into an upper and a lower chamber, means for relieving the pressure in said upper chamber when it is desired to operate the valve, a by-pass for restoring the pressure in said upper chamber after a predetermined period, a skirt surrounding said by-pass and forming a chamber thereabout, said skirt having at least an opening near the upper end thereof, the lower end of said skirt being disposed in the direct line of flow of the water in passing out of said valve when the valve is reseating.

EDWARD G. HEDGES.